Figure 3:
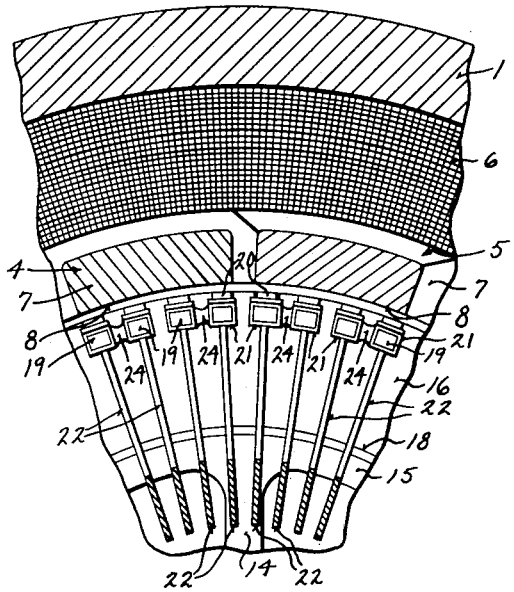

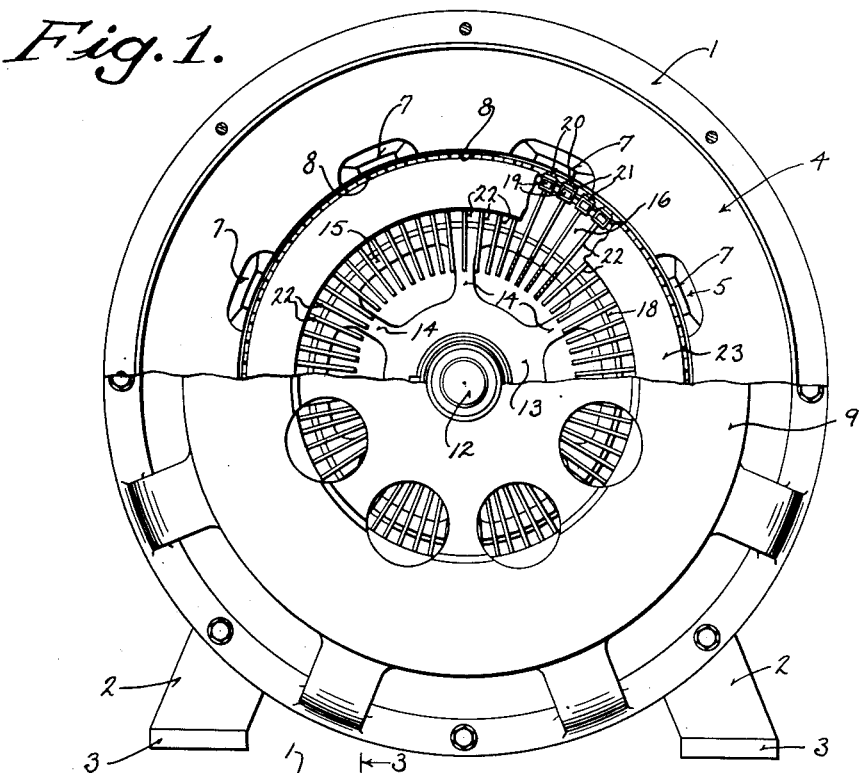

Sept. 11, 1956  K. L. HANSEN  2,762,940
INDUCED CURRENT ROTARY APPARATUS
Filed Nov. 16 1953  2 Sheets-Sheet 2

INVENTOR
Klaus L. Hansen

BY Arthur N. Seidel

ATTORNEY

United States Patent Office 2,762,940
Patented Sept. 11, 1956

2,762,940

INDUCED CURRENT ROTARY APPARATUS

Klaus L. Hansen, Milwaukee, Wis., assignor to Harnischfeger Corporation, Milwaukee, Wis., a corporation of Wisconsin Application November 16, 1953, Serial No. 392,397

8 Claims. (Cl. 310—105)

This invention relates to induced current torque transmitting apparatus suitable for use as a clutch or brake and it more specifically resides in an apparatus having relatively rotatable field and induced current members wherein the field member includes a plurality of poles producing a magnetic field through which electrically joined inductor bars in the induced current member pass which causes currents to be induced therein giving rise to working torque, the inductor bars being electrically joined into distinct groups through low resistance junctions at the ends thereof, and relatively high resistance connections between the ends of the bars, electrically outside of said low resistance junctions whereby high and consistent torque over a wide range of slip is obtainable.

The field member of an induced current coupling of the general class to which this invention pertains usually comprises a plurality of magnetic poles energized by windings. The flux produced extends through the field member and into and through a magnetic member which is relatively rotatable and disposed in close facing relation to the field poles. Current is induced in inductor bars embedded within the magnetic member. End connections for the bars provide for substantial current flow and consequent working torque.

Torque transmitted by such apparatus at constant field excitation varies with the relative speed between the field and induced current members, and the form of the speed-torque curve depends upon the resistance and leakage reactance of the inductor bar circuits. It may be considered that the torque of such an induced current coupling is limited by both factors. Under conditions where slip between field and induced current members is small, the leakage reactance will likewise be small, and resistance will largely govern torque output. For an inductor bar circuit of low resistance, torque will be greater at small slip values than it will be with an inductor bar circuit of higher resistance. A high resistance induced current member, with its lower torque at low slip speeds, is therefore not desirable, since if used as a brake it will not exhibit sufficient continued high torque when approaching standstill, and if used as a clutch it will run with objectionably large slip as the driven member approaches driving member speed. As the slip-speed of such a high resistance induced current member is increased the torque output will rise to a maximum value. This value becomes limited if leakage reactance, which increases with increasing slip becomes dominant, but resistance may be made sufficient so that torque output will remain substantial through the entire high slip working range. Thus, a high resistance inductor circuit is desirable at the higher slip speeds.

In the case of an induced current member, having elements forming a low resistance circuit, torque will be greater than for a high resistance member in the lower slip speed ranges. The limiting effect of resistance is much reduced and at low slip the reactance is not the dominant or controlling factor. As in the case of a high resistance induced current member, the maximum torque will depend upon the reactance, and will, in the low resistance member, occur at a lower slip speed. As the slip is increased above that for maximum torque the increasing reactance will limit and cause a decline in the torque output. An induced current torque transmitting apparauts which exhibits a sharply decreasing torque, with increasing slip, within the operating speed range, is undesirable if not impractical.

It is of particular advantage to combine the characteristics of high and low resistance induced current circuits in one and the same unit if such may be done without unduly large increase in weight and expense and without impairment of the maximum torque values. Resulting maintenance of substantially high torque over an increased range of slips speeds enhances both brake and clutch characteristics.

In certain instances of induction motors, it has been the practice to form inductor bars of low resistance with a configuration that causes the induced currents to be confined within a small portion of the cross section area of the bars at the higher rotor frequencies, or slip speeds. At low slip the entire section of the bar functions to conduct and a low resistance rotor is available. The bars act as high resistance conductors at the high slip speeds or as low resistance conductors as occasion may require and substantial torque output is maintained over a considerable speed range. So-called double squirrel cage rotors are a specialized form of this practice. This manner of sustaining torque at both ends of the speed range in a brake or clutch is objectionable since additional leakage reactance is introduced into the rotor circuit with attendant reduction in peak torque output at intermediate speeds and the deep slots required result in unduly heavy construction.

It is an object of this invention to provide an induced current coupling having a high torque output over a substantial and increased range of slip speeds.

It is another object of this invention to provide an induced current coupling having a rapid rise in torque as slip speed is increased by small amounts above the zero slip speed condition.

It is another object of this invention to provide an induced current coupling in which there is a low resistance, low reactance inductor bar circuit to aid in obtaining the foregoing torque-slip speed characteristics.

It is a further object of this invention to provide an induced current coupling wherein the principal losses in the form of heat arising from the action of the induced currents will occur in members other than and outside of the inductor bars to accomplish the required heat dissipation without destructive temperatures occurring in parts which are not suitable for high temperature operation.

These and other objects and advantages of this invention will appear in the description to follow. In the description reference is made to the accompanying drawings, which form a part hereof, and in which there is shown by way of illustration and not of limitation a specific form in which this invention may be embodied.

In the drawings:

Fig. 1 is an end view in elevation with parts broken away of an induced current brake in which this invention is embodied, Fig. 2 is a side view in elevation with parts broken away and in section of the induced current brake shown in Fig. 1, Fig. 3 is a fragmentary end view in elevation with parts in section of the field and induced current members of the induced current brake shown in Figs. 1 and 2.

Figure 5:
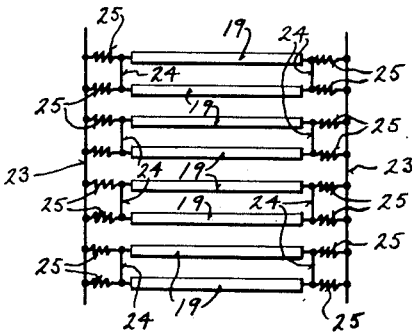
Figure 4:
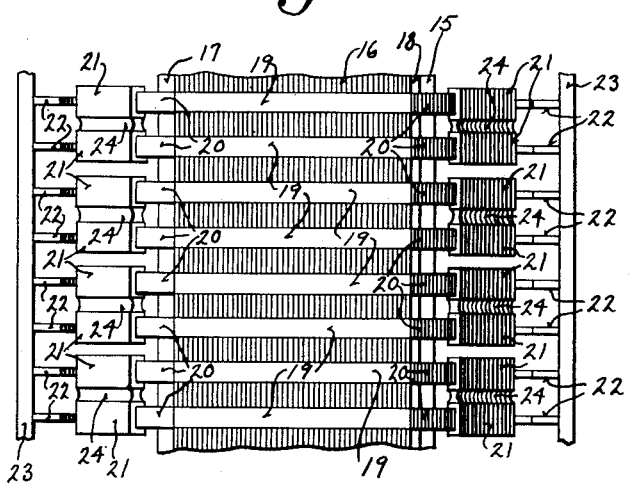
Figure 6:
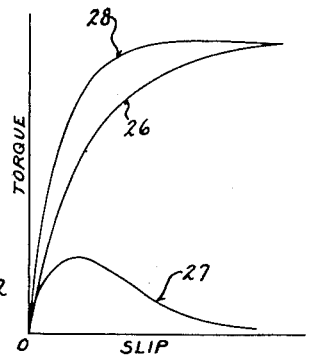

Fig. 4 is a fragmentary developed view of the air gap surface of the induced current member showing the inductor bar and end ring members, Fig. 5 is a schematic view of a portion of the electrical circuit of the induced current member, and Fig. 6 is a graph of representative slip-speed versus torque characteristics for the induced current brake and certain subsidiary circuits thereof.

Referring now to the drawings, and initially more particularly to Figs. 1 and 2 thereof, there is shown a brake having a circular cylindrical frame 1 of magnetic material to which is secured a set of four downwardly extending legs 2. The legs 2 are paired and joined with transversely extending horizontal mounting plates 3—3 attached to the bottoms of the pairs to provide supporting feet for the apparatus of sufficient strength to withstand the torque reaction of the brake. A field member is formed by mounting on the inner cylindrical face of the frame 1 a pair of magnetic pole rings 4 and 5 which are spaced from one another to provide space to accommodate an annular field coil 6 seated therebetween. Extending radially inwardly from and then laterally with respect to the pole rings 4, 5 are circumferentially spaced pole pieces 7 that turn about the inner face of the field coil 6 and present a plurality of inwardly disposed axially extending pole faces 8. The poles 7 of the ring 4 are staggered with respect to those of ring 5 so that the poles of the rings are interjacent to produce, upon energization of the field coil 6, circumferentially spaced, alternate, north and south magnetic poles.

A pair of end bells 9, bolted to the opposite ends of the frame 1, extend radially inwardly to support a pair of axially aligned central bearing seats 10 in which ball bearings 11—11, are secured. Rotatably supported by the ball bearings 11—11 is an output shaft 12 overhanging the end bells 9 for suitable connection with equipment to be controlled. A rotor hub 13, disposed within the pole rings 4 and 5, is keyed to and borne by the central portion of the shaft 12. Secured to and extending radially from the hub 13 are a plurality of spokes 14 joined at their outer ends to an integral felloe 15. Seated upon the outer face of the felloe 15 is a rotor drum 16 of stacked magnetic laminations. One side of the drum 16 abuts a collar 17 forming a radial extension of the felloe 15, while the opposite side of the drum 16 is retained by a lock ring 18 seated in a groove in the felloe 15 as shown.

A plurality of axially extending conductor bars 19 are received within slots in the outer peripheral face of the magnetic rotor drum 16. Upon energization of the field coil 6 and rotation of the drum 16 the conductors 19 will sweep through the flux field as a result of which currents are induced therein producing working torque. Each of the bars 19 is relatively wide and shallow and the outer surface thereof is flush with the air gap surface of the drum 16 to present a current path of low resistance with small leakage reactance, in position to intercept even that flux which penetrates but a short distance.

The bars 19 extend axially from each side of the drum 16 with inwardly bent ends 20 over which are fitted conducting collars 21 of low resistance, the collars being brazed securely in place electrically and mechanically. On the inner side of each collar 21 there is welded a fin 22 that extends radially inwardly towards the shaft 12 and then turns backwardly upon itself to extend radially outwardly. Each fin 22 is composed of a conducting material exhibiting a resistance value which is substantial with respect to the resistance of an individual conductor bar 19. The fins 22 are electrically connected one to the other by end rings 23 welded in place in notches disposed at the fin ends electrically remote from the connections with the conductor bars 19. There is thus provided at the ends of the conductor bars 19 closed circuit end rings which establish a squirrel cage of comparatively high resistance which joins each conductor bar 19 through an appreciable resistance path with each of the other bars 19.

In addition the conductor bars 19 are grouped into separate pairs or sets, each pair or set being composed of adjacent bars that span a segment less than a full pole pitch. As clearly shown in Figs. 3 and 4, bars of a pair or set are joined to one another by short circuit connections 24 extending between the collars 21 at the bar ends. The connections 24 are each of large cross section and have negligible resistance, thus effectively providing a short circuit path between the ends of the bars in a set. Each conductor bar 19 therefore constitutes a portion of a low resistance circuit including an adjacent bar and the connections 24 therebetween, and also constitutes a portion of several high resistance circuits leading through the fin and end ring assembly to the bars 19 in the other groups.

Referring now to Fig. 5, there is schematically represented a portion of the induced current circuit of the rotor. Between the ends of the conductor bars 19 and the end rings 23 are shown a plurality of resistances 25 corresponding to the substantial resistance exhibited by the fins 22, and which are each hereinafter referred to as a fin resistance 25. The short circuit connections 24 between bars 19 of a pair are located electrically as shown. With respect to the bars 19 these connections are electrically inside of the fin resistances 25. The fin resistances 25 are conversely electrically outside of the connections 24 and form no substantial part of the low resistance circuit paths between bars of a set.

The high-resistance end-ring circuit, comprising end rings 23 and fins 22, in which all the bars 19 are connected to one another, as in the usual squirrel-cage construction would exhibit torque, slip-speed characteristics in the absence of the connections 24, such that low torque would prevail at low slip values. The curve 26 in Fig. 6 is representative of such torque, slip-speed relationship. As has been hereinbefore noted, the low torque at low slip, due to high resistance in the circuit, is not desirable. However, it is of advantage to retain the fin resistance 25 at a substantial value. Heat losses in the induced current circuit will then be localized in the fins 22, rather than in the rotor conductors 19. Cooling air passing across the large surface areas of the fins 22 will more readily absorb the heat released and will do so at lower temperatures. High fin resistance also maintains substantial torque output at the larger slip values, which is necessary for effective brake or clutch action.

The short circuit connections 24 that join the bars 19 into sets form a plurality of separate low resistance circuits in the rotor, superimposed upon the high resistance squirrel cage circuits comprising the fins 22 and end rings 23. These low resistance circuits, if considered separately from the high resistance end ring circuits will result in the exertion of high torque at low slip first increasing and then rapidly diminishing as slip is increased past the maximum torque value. Curve 27 in Fig. 6 represents the torque, slip-speed relationship for a low resistance circuit of this type.

The combined effect of the high and low resistance circuits that is obtained by including both in a single induced current member with common rotor bars 19, as described and shown in the drawings, is represented by curve 28. Curve 28 appears as a composite of the curves 26 and 27 providing a higher torque for the low slip values than obtainable from the high resistance cage alone. For the range of higher slip values the torque contribution of the low resistance circuit becomes negligible and the high resistance end ring circuits dominate the output characteristics to provide substantial and nearly constant torque output.

For induced current brakes and clutches the composite characteristics of the curve 28 provides for enhanced performance. For a brake, torque will remain at a high level over an extended range of slip for contined quick deceleration as a load approaches standstill. In the instance of a clutch, the driven member may be accelerated to desired speed within a lessened period and running slip will be reduced with a decrease in the slip losses.

In the apparatus of this invention there are provided both high and low resistance circuit paths for induced currents that are disposed outside the flux conducting drum. The physical configuration of the bars 19 is not a determinative factor in providing both high and low resistance current paths. As a consequence the bars 19 may be wide and shallow to present a negligible resistance and a minimum leakage reactance for all slip speeds. Small leakage reactance permits high maximum torque output and with the substantial resistance in the fins 22 heat dissipation is rapid to enhance the continuous duty output.

The shape of the composite curve 28 may be conveniently altered to suit particular requirements. Connections 24 can be removed and the bars 19 may then be regrouped in combinations other than pairs of adjacent bars. For example, connections 24 may be used to short circuit the ends of three successive bars to one another, thus arranging the bars 19 in separate groups of three. The high resistance circuits including the fins 22 will still provide a high resistance circuit for high torque at high slip. The groups of three extend over a greater portion of a pole pitch and at low slips the torque output may be increased. Regrouping in this manner may also affect the maximum torque available, and thus it is possible to alter the torque, slip-speed characteristic to suit a variety of needs after the apparatus has been constructed and fully assembled. Further torque modifications may, of course, be made by substitution of cooling fins of varying resistance value, or by segmenting the end rings employed. In each instance there is retained the essential requirement of both low and high resistance circuits external of the inductor bars 19.

I claim:

1. In an induced current torque transmitting apparatus the combination of a relatively rotatable field member having a plurality of magnetic pole pieces and an induced current member including flux conducting magnetic material closely spaced from said pole pieces, a plurality of inductor bars mounted in and supported by said induced current member in flux linking relation to said field member for the induction of currents therein, said bars being joined into electrically distinct groups by low resistance connections at the ends thereof, and end ring connections in addition to said low resistance connections of relatively high resistance permanently connected to the ends of the bars at points electrically outside of said low resistance connections whereby the bars are joined in relatively high resistance squirrel cage relation throughout the entire slip-speed range of operation.

2. In an induced current torque transmitting apparatus the combination of a relatively rotatable field member having a plurality of magnetic pole pieces and an induced current member including flux conducting magnetic material closely spaced from said pole pieces, a plurality of inductor bars supported by said induced current member in flux linking relation to said field member for the induction of currents therein, said bars being joined into electrically distinct groups by low resistance connections at the ends thereof with the bars within a group confined to a portion of said peripheral air gap surface corresponding to less than a full pole pitch, and end ring connections in addition to said low resistance connections of relatively high resistance permanently connected to the ends of the bars at points electrically outside of said low resistance connections whereby the bars are joined in relatively high resistance squirrel cage relation throughout the entire slip-speed range of operation.

3. In an induced current torque transmitting apparatus the combination of a relatively rotatable field member having a plurality of magnetic pole pieces and an induced current member including flux conducting magnetic material closely spaced from said pole pieces, a plurality of inductor bars supported by said induced current member in flux linking relation to said field member for the induction of currents therein, said bars being joined into pairs by low resistance connections at the ends thereof, and end ring connections in addition to said low resistance connections of relatively high resistance permanently connected to the ends of the bars at points electrically outside of said low resistance connections whereby the bars are joined in relatively high resistance squirrel cage relation throughout the entire slip-speed range of operation.

4. In an induced current torque transmitting apparatus the combination of a relatively rotatable field member having a plurality of magnetic pole pieces and an induced current member including flux conducting magnetic material closely spaced from said pole pieces, a plurality of inductor bars mounted in and supported by said induced current member in flux linking relation to said field member for the induction of currents therein, said bars being joined into pairs each comprising two adjacent bars by low resistance connections joining the bars at the ends thereof, and end ring connections in addition to said low resistance connections of relatively high resistance permanently connected to the bars of each pair at points electrically outside of said low resistance connections whereby the bars are joined in relatively high resistance squirrel cage relation throughout the entire slip-speed range of operation.

5. In an induced current torque transmitting apparatus the combination of a relatively rotatable field member having a plurality of magnetic pole pieces and an induced current member including flux conducting magnetic material closely spaced from said pole pieces, a plurality of inductor bars mounted in and supported by said induced current member in flux linking relation to said field member for the induction of currents therein, said bars being joined into electrically distinct groups by low resistance connections at the ends thereof, and high resistance connections in addition to said low resistance connections permanently connected to both ends of said bars at points electrically outside of said low resistance connections throughout the entire slip-speed range of operations.

6. In an induced current torque transmitting apparatus the combination of a field member having a plurality of magnetic pole pieces, an induced current member relatively rotatable with respect to said field member having a drum of magnetic material closely spaced from said pole pieces in flux conducting relation thereto, a plurality of inductor bars mounted by said drum of said induced current member in flux linking relation to said field member for the induction of currents therein, end connections including cooling fins of relatively high resistance joining both ends of said bars to provide a relatively high resistance path between bar ends for said induced currents, and low resistance connections joining bars into pairs and connecting with the bars of a pair at points electrically inside said end connections.

7. In an induced current torque transmitting apparatus the combination of a field member having a plurality of magnetic pole pieces, an induced current member relatively rotatable with respect to said field member having a drum of magnetic material closely spaced from said pole pieces in flux conducting relation thereto, a plurality of inductor bars mounted by said drum of said induced current member in flux linking relation to said field member for the induction of currents therein, end connections of relatively high resistance permanently joining both ends of said bars to provide a relatively high resistance path between bar ends for said induced currents throughout the entire slip-speed range of operation, and low resistance connections joining said bars into groups and connecting with the bars in a group at points electrically inside said end connections.

8. In an induced current torque transmitting apparatus the combination of a relatively rotatable field member having a plurality of magnetic pole pieces and an induced current member including flux conducting magnetic material closely spaced from said pole pieces, a plurality of inductor bars supported by said induced current member in flux linking relation to said field member for the induction of currents therein, said bars being joined into electrically distinct groups by low resistance connections at the end thereof, and high resistance connections in addition to said low resistance connections electrically connected to ends of said bars at points electrically outside of said low resistance connections that are located outside the flux conducting magnetic material of the induced current member in position remote from flux linking relation with respect to said field member.

References Cited in the file of this patent

UNITED STATES PATENTS

| 782,054 | Reist | Feb. 7, 1905 |
| 2,259,311 | Kilgore | Oct. 14, 1941 |

FOREIGN PATENTS

| 474,258 | Great Britain | Oct. 28, 1937 |